2,857,407
HYDROLYSIS OF 21-ACYLOXY STEROIDS

Douglas E. Rayman, Schoolcraft Township, Kalamazoo County, and Paul E. Marlatt, Kalamazoo Township, Kalamazoo County, Mich., assignors to The Upjohn Company, Kalamazoo, Mich., a corporation of Michigan No Drawing. Application February 8, 1956
Serial No. 564,113

5 Claims. (Cl. 260—397.45)

This invention relates to the hydrolysis of certain acyloxy steroids to produce the corresponding steroid free alcohol. It relates more particularly to the hydrolysis of 21-acyloxy hydrocortisone and 21-acyloxy derivatives of certain compounds related structurally to hydrocortisone. In one of its aspects, it relates to the recovery of free steroid alcohol from binary solvent systems comprising water and a volatile organic solvent.

The chemical synthesis of hydrocortisone and structurally related steroids commonly involves steps of converting the 21-esters to the free steroid 21-alcohols by hydrolysis. The conversion is advantageously an alkaline hydrolysis, brought about by adding an aqueous solution of an alkaline agent such as an alkali-metal bicarbonate to a solution of the 21-acyloxy steroid in a water-miscible organic solvent. The solvent is usually one having a volatility greater than water, such as an alkanol, e. g., methanol, or ethanol, the amount of alkaline agent being in excess of that required for the hydrolysis reaction. The hydrolyte, after hydrolysis is complete, is then treated to recover the free steroid alcohol by steps involving neutralizing residual alkali in the solution and subsequently recovering the steroid alcohol.

The neutralized solution of alkali-hydrolyzed steroid alcohol is a binary solvent system containing in solution the free steroid 21-alcohol together with a minor amount of water-soluble non-volatile salts including alkali-metal salts of the neutralizing acid. It has been found that this type of system presents special recovery problems adversely affecting the yield and quality of final product.

This invention has among its objects the provision of a process of neutralization and recovery of steroid alcohol from the alkaline hydrolysis reaction mixtures of 21-acyloxy hydrocortisone, 21-acyloxy cortisone, or the analogous compounds possessing additional $\Delta^1$-unsaturation in the molecule, i. e., 21-acyloxy $\Delta^1$-hydrocortisone (I) and 21-acyloxy $\Delta^1$-cortisone (II).

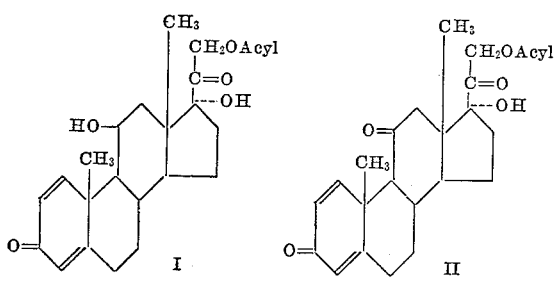

In each instance the 21-acyloxy group is one in which the acyl radical is that of a hydrocarbon carboxylic acid containing from one to twelve carbon atoms, inclusive, such as formic, acetic, butyric, valeric, isovaleric, triethylacetic, octanoic, cyclopentylformic, β-cyclopentylpropionic, benzoic, 3,5-dimethylbenzoic, phenylacetic, triphenylacetic, and the like.

A further object is to provide a novel process of neutralization, concentration and crystallization of said compounds from said hydrolysis mixture whereby improved yield and quality are obtained. Still another object is the provision of a process whereby the neutralization of the hydrolysis reaction mixture is carried out using a mineral acid or an organic acid, and the concentration and crystallization is carried out as a series of at least two stages in which conditions of temperature and steroid concentration are controlled so as to afford maximum yield of high purity crystalline product.

Still another object of the invention is to provide a process for recovering a steroid alcohol of the type previously mentioned from solution in a binary solvent system comprised of water and a volatile, water-miscible organic solvent, and containing minor quantities of dissolved non-volatile salts.

In the neutralization and recovery of steroid alcohol from alkaline hydrolysis reaction mixtures, prior workers have employed acids such as aqueous acetic acid or hydrochloric acid and subsequently recovered the steroid alcohol, e. g., hydrocortisone or cortisone, by extraction with a selective organic solvent or by evaporation of the reaction mixture and subsequent crystallization of the steroid alcohol. The former method of recovery, i. e., by extraction, is expensive and productive of an extract which frequently must be separated chromatographically from dissolved impurities. The latter is the recovery method of choice, particularly when larger quantities are involved, for the product is usually directly recoverable in a state of satisfactory yield and quality. Nevertheless, when the neutralized reaction mixture is subjected to the usual conditions of reduced pressure to remove a portion of the solvent, the steroid alcohol often precipitates suddenly as an oily product which, upon cooling, solidifies to an amorphous mass that is only partially crystalline. This occurrence results in decreased yield and quality.

The formation of an amorphous oily precipitate during the evaporation of solvent from such a binary solvent mixture, one component being water and the other a volatile, water-miscible organic solvent, particularly one containing dissolved non-volatile salts, is not uncommon in the field of steroids. Heretofore, no satisfactory method has been devised to avoid its occurrence, which is frequently unpredictable.

According to the invention, the neutralization of the hydrolysis reaction mixture is carried out with an aqueous solution of an acid. An organic acid such as acetic acid can be used. In the case of the two $\Delta^1$-compounds, however, it is preferable to use a mineral acid, preferably a non-oxidizing acid such as hydrochloric acid or sulfuric acid. The neutralization is carried to a pH not greater than 7.0. In the case of the two $\Delta^1$-compounds, using mineral acid, it is preferably carried to a pH of about three to five.

Upon neutralization, the reaction mixture is concentrated at a pressure of atmospheric or less, preferably at a distilland temperature of from twenty to 45 degrees centigrade, inclusive, the vapors comprising principally the volatile organic solvent.

The amount of water necessary initially in the binary solvent mixture may vary widely so long as care is taken that there is sufficient to avoid supersaturation at the temperature of evaporation. The amount should be such that the final volume of the liquor immediately prior to final crystal recovery is sufficient to retain in solution the non-volatile salts and to afford a fluid slurry of the steroid alcohol crystals. The addition of water may therefore be necessary during the evaporation in mixtures containing insufficient water initially.

The presence of water in the solvent mixture, heretofore regarded as undesirable because of its adverse effect upon the physical character of the product, is in fact advantageous in the process of this invention. In the novel process of the invention the minor quantity of dissolved non-volatile salts assists in crystallization of the steroid alcohol through their salting-out effect. The salt solution moreover provides a suspending means for removing the crystals from the evaporation vessel. After filtration, the small volume of salt-containing mother liquor can be extracted with a steroid solvent such as methylene chloride to recover residual steroid alcohol contained therein.

The evaporation is carried out under the conditions previously mentioned, preferably under considerably reduced pressure. Evaporation is continued until a point of concentration of steroid alcohol is reached that is not substantially greater than saturation at the conditions of evaporation. Preferably the concentration is slightly less than saturation, i. e., to a point such that added seed crystals will not dissolve. As soon as this point is reached, seed crystals are added, if necessary to promote crystallization, and the mixture is cooled to a crystallization temperature, i. e., below twenty degrees centigrade. It is held at that temperature for a period sufficient to permit the steroid alcohol to crystallize to conditions of substantial equilibrium. This first crop of crystals may be harvested in part at this point, or left in the mixture. It is necessary, however that a sufficient portion be left in the mixture to act as seed for further crystallization.

The crystallized mixture is again evaporated under the evaporation conditions previously mentioned, until the solvent system becomes essentially aqueous and the volume of the mixture is further substantially reduced. If desired, especially in instances where the volume of aqueous solvent is greatly in excess of that necessary to retain the non-volatile salts in solution, evaporation is continued until only enough remains to retain the salts in solution at the temperature of crystallization and provide a fluid slurry for the steroid alcohol.

This second step of evaporation is followed by a second step of cooling and crystallization at a temperature below twenty degrees centigrade, whereupon the crystals of steroid alcohol are harvested by filtration, centrifugation, or the like, and the residual mother liquor treated as by extraction to recover the small amount of dissolved steroid alcohol.

It is important that in each step of evaporation the point of solution saturation is not substantially exceeded. Upon raising the temperature for a subsequent evaporation and crystallization stage, i. e., the second step of concentration and the second step of crystallization, small amounts of crystallized steroid alcohol may redissolve, but the major proportion will remain in the system as crystals. As a consequence, the further evaporation and cooling which occur in these two steps of the subsequent cycle bring about a steady separation of pure discrete crystals readily separable from the mother liquor.

The hydrolysis step of the overall conversion process can be carried out generally in accordance with the methods applied to the hydrolysis of 21-esters of hydrocortisone and $\Delta^1$-hydrocortisone as disclosed and claimed in copending application Serial No. 514,760, filed June 10, 1955. Thus, the 21-esters of cortisone, hydrocortisone, $\Delta^1$-cortisone or $\Delta^1$-hydrocortisone dissolved in a substantially oxygen-free lower-alkanol can be hydrolyzed with an alkali-metal bicarbonate in a non-reactive atmosphere, such as in the absence of atmospheric oxygen and significant amounts of carbon dioxide. A blanketing nitrogen atmosphere is a convenient method of maintaining a non-reactive atmosphere. Preferably the non-reactive atmosphere is maintained throughout the process, i. e., during the subsequent steps of crystallization, filtration, and the like.

The following examples are illustrative of the process and products of the present invention, but are not to be construed as limiting.

EXAMPLE 1

*Hydrolysis of hydrocortisone 21-acetate and recovery of hydrocortisone*

(A) Hydrocortisone 21-acetate is dissolved in methanol in the proportion of 41.78 kilograms of the former in 544 gallons of the latter. To effect solution and expel oxygen, it is convenient to heat the mixture to reflux temperature and distill over a small amount of methanol, say two or three gallons. The air in the reaction vessel is replaced, while stirring, with an atmosphere of nitrogen. After complete solution, the reaction mixture is cooled to ten to twenty degrees centigrade, and an aqueous solution of potassium bicarbonate added. The potassium bicarbonate solution is prepared by dissolving 41.8 kilograms of potassium bicarbonate in 54.4 gallons of deionized water. Preferably the deionized water is first freed of dissolved oxygen by bubbling through nitrogen for a period of one hour or longer. The reaction mixture, after addition of the bicarbonate solution, is stirred while maintaining the temperature at ten to twelve degrees centigrade for a period of time sufficient to effect hydrolysis. The point of complete hydrolysis by the potassium bicarbonate is conveniently determined by paper chromatographic analysis. An analysis showing less than one percent of the 21-acylate compared with the free steroid alcohol can be taken as a convenient end point. To the hydrolyzed mixture is then added a solution of acetic acid sufficient to neutralize the alkali present. In this case a solution made by dissolving 8.2 gallons of acetic acid in 165 gallons of methanol is used. The neutralized reaction mixture (pH 6.5) is then stirred at approximately forty degrees for a period of ten to fifteen minutes to insure complete solution. The neutralized solution is then clarified with about five pounds of activated carbon (Darco) and stirred for an additional period of thirty minutes. It is then filtered through a suitable clarifying filter, and the filter rinsed with five gallons of hot methanol.

The filtered solution is then subjected to vacuum in a 1000 gallon jacketed vessel where the temperature is maintained within the range of fifty to 55 degrees centigrade. The temperature of the body of distilland ranged between approximately 25 to 35 degrees centigrade. As soon as the volume of the reaction mixture becomes reduced to about eighty percent of the original, water is added to make up to its original volume. The solution is concentrated at the maintained temperature until the volume has been reduced to 420 gallons. At this time, a slight turbidity occurs in the solution. A small amount of crystals of hydrocortisone are added as seed and the solution cooled to ten to twelve degrees. The temperature is maintained within this range until no further crystallization occurs.

The reaction mixture, now containing the first crop of hydrocortisone crystals, is heated again to a temperature of 25 to 35 degrees centigrade by leading warm water through the jacket of the vessel, vacuum is applied and concentration carried out to a volume of 126 gallons during which the solvent became essentially aqueous. The solution is then cooled to ten to twelve degrees centigrade again, whereupon further crystals separate. When no further crystallization takes place, the reaction mixture is filtered, and the filtered crystals washed with filtered deionized water. The product is subsequently dried in a vacuum at 100 degrees centigrade for approximately sixteen hours. The yield of hydrocortisone was 92.6 percent of theoretical. The product has a melting point of 213 degrees centigrade; $[\alpha]_D$ (acetone) plus 165 degrees, and the product contained no ash.

(B) For purposes of comparison, the foregoing example was repeated through the step of activated carbon treatment and filtration. Concentration was carried out at forty degrees centigrade however, adding approximately the same amount of water during the initial stages to raise the volume to the original volume. Concentration was continued to a volume of 160 gallons whereupon an oily product separated. The solution was then cooled overnight at a temperature within the range of ten to twelve degrees centigrade. During the cooling the oil solidified to a semi-amorphous mass. The remaining liquid, after no further crystal formation occurs, was filtered and washed as before. The product represented a yield of 85.2 percent of the theoretical. It has a melting point of 208 degrees centigrade and an $[\alpha]_D$ (acetone) of plus 166.5 degrees.

EXAMPLE 2

Hydrolysis of $\Delta^1$-cortisone 21-acetate and recovery of $\Delta^1$-cortisone The procedure of Example 1A was repeated, using instead 2.63 kilograms of $\Delta^1$-cortisone acetate dissolved in 70.7 gallons of methanol as starting material. In this case sufficient acetic acid is added to give a pH of between 6.0 and 6.5. The neutralized solution is Darcoed and filtered as in Example 1A. The steps of concentration and cooling are carried out as in Example 1A, the final volume of the solution being approximately fourteen gallons. The filtered and washed product is then dried to constant weight as in Example 1A giving a yield of 80.9 percent of theoretical, the product having a melting point of 228 to 230 degrees centigrade and an $[\alpha]_D$ (dioxane) of plus 169 degrees.

EXAMPLE 3

Hydrolysis of $\Delta^1$-cortisone 21-acetate and recovery of $\Delta^1$-cortisone Example 2 was repeated, using instead 1.5 kilograms of $\Delta^1$-cortisone acetate dissolved in 41.60 gallons of methanol as starting material. The quantities of potassium bicarbonate and acid were accordingly reduced in proportion. However, in this example 610 milliliters of 38 percent hydrochloric acid dissolved in 6.0 gallons of deionized water was used in place of the acetic acid of Example 2. The acid brought the pH to the range of 3.0 to 4.0. The solution was Darcoed, filtered and subjected to two cycles of concentration and cooling, as described in Example 2. The crystallized product, after filtering and washing, was dried to constant weight in a vacuum oven at seventy to eighty degrees centigrade. The yield was 90.4 percent of theoretical and the product melted at 228 to 229.5 degrees centigrade. The $[\alpha]_D$ (dioxane) was plus 169.

Comparison of the foregoing example with that of Example 2 illustrates the advantage of using a mineral acid for neutralizing the hydrolyzed reaction mixture of $\Delta^1$-cortisone.

EXAMPLE 4

Hydrolysis of hydrocortisone 21-acetate and recovery of hydrocortisone

Example 3 was repeated, using instead a solution of 10.1 grams of hydrocortisone acetate dissolved in 800 milliliters of methanol. The volume at the end of the first stage was 400 milliliters, and at the final stage was 130 milliliters. The filtered and washed product, dried to constant weight in vacuo, represented a yield of 96.0 percent of theoretical and had a melting point of 211.5 to 214 degrees centigrade.

EXAMPLE 5

Hydrolysis of $\Delta^1$-hydrocortisone 21-acetate and recovery of $\Delta^1$-hydrocortisone Example 3 was repeated, using instead 22 pounds of $\Delta^1$-hydrocortisone acetate dissolved in 266 gallons of methanol as starting material. Eleven pounds of potassium bicarbonate dissolved in 26.4 gallons of deionized water was used to effect hydrolysis. The hydrolyzed reaction mixture was neutralized to a pH of 3.0 to 4.0 using a solution of 4,230 milliliters of 38 percent hydrochloric acid dissolved in 15.9 gallons of deionized water. The volume at the end of the first stage of concentration was 100 gallons, and at the final stage was thirty gallons. The filtered, washed and dried product represented a yield of 94.6 percent of the theoretical. The melting point was 231.5 to 235 degrees centigrade, and $[\alpha]_D$ (dioxane) was plus 99 degrees.

EXAMPLE 6

Hydrolysis of cortisone 21-acetate and recovery of cortisone

Example 4 was repeated, using as starting material 10.1 grams of cortisone 21-acetate dissolved in 500 milliliters of methanol. To neutralize the hydrolyte 7.5 milliliters of glacial acetic acid dissolved in 150 milliliters of methanol was used instead of the aqueous hydrochloric acid used in Example 4. During the first step of evaporation at a bath temperature of about fifty degrees centigrade, 150 milliliters of deionized water was added slowly. The yield of cortisone was 95 percent of theory. Its melting point was 213.5 to 218.0 degrees centigrade and $[\alpha]_D$ (acetone) was plus 177.4 degrees.

In the foregoing examples an equivalent amount of other acid, e. g., sulfuric acid, can be used in place of the aqueous hydrochloric acid or acetic acid to neutralize the hydrolyzed reaction mixture. The specific volumes involved may be varied over a wide range as dictated by convenience and economics so long as the amount of water is adjusted so that the final solvent is essentially aqueous and sufficient in amount to retain the non-volatile salts in solution and provide a fluid slurry for the steroid alcohol crystals.

It is to be understood that the invention is not to be limited to the exact details of operation or exact compounds shown and described, as obvious modifications and equivalents will be apparent to one skilled in the art, and the invention is therefore to be limited only by the scope of the appended claims.

We claim:

1. The process of hydrolyzing a steroid ester of the group consisting of hydrocortisone 21-acylate, cortisone 21-acylate, $\Delta^1$-hydrocortisone 21-acylate and $\Delta^1$-cortisone 21-acylate to the corresponding free steroid 21-alcohol which comprises adding to said steroid ester dissolved in a lower-alkanol an aqueous solution of an alkali-metal bicarbonate in excess of the theoretical required for saponification, permitting hydrolysis to said free steroid alcohol to proceed to substantial completion, acidifying said solution to a pH not greater than 7.0 by means of an acid, thereby producing an aqueous lower-alkanol solution containing said free steroid alcohol and dissolved non-volatile salts, concentrating said acidified solution at a temperature within the range of twenty to 45 degrees centigrade, inclusive, until the concentration of free steroid alcohol is approximately, but not substantially greater than saturation, cooling said concentrated reaction mixture to a crystallization temperature below twenty degrees centigrade whereby steroid alcohol crystals are formed and maintaining said crystallization temperature for a period of time sufficient for the system to achieve a state of crystallization equilibrium, retaining at least a substantial portion of steroid alcohol crystals in the system, repeating the steps of concentration and crystallization to a step of final crystallization, the amount of water in the solvent system being such that at said step of final crystallization, the solvent is essentially aqueous and is of sufficient volume to retain in solution said non-volatile salts and to afford a fluid slurry of steroid alcohol crystals, and finally recovering steroid alcohol crystals from said fluid slurry.

2. The method of claim 1 in which the starting steroid ester is hydrocortisone 21-acetate.

3. The method of claim 1 in which the starting steroid ester is cortisone 21-acetate.

4. The method of claim 1 in which the starting steroid ester is $\Delta^1$-hydrocortisone 21-acetate and the acid is hydrochloric.

5. The method of claim 1 in which the starting steroid ester is $\Delta^1$-cortisone 21-acetate and the acid is hydrochloric.

References Cited in the file of this patent
UNITED STATES PATENTS

| | | |
|---|---|---|
| 2,166,877 | Reichstein | July 18, 1939 |
| 2,634,277 | Minlon | Apr. 7, 1953 |
| 2,656,367 | Graber | Oct. 20, 1953 |